United States Patent
Bozich et al.

(10) Patent No.: US 12,030,513 B2
(45) Date of Patent: Jul. 9, 2024

(54) VEHICULAR DOOR OPENING WARNING SYSTEM

(71) Applicant: Magna Electronics Inc., Auburn Hills, MI (US)

(72) Inventors: Richard C. Bozich, Canton, MI (US); Nikhil Gupta, Brampton (CA); Suresh Boddi, New Hudson, MI (US); Jyothi P. Gali, Rochester Hills, MI (US); Alan M. Cordeiro, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 108 days.

(21) Appl. No.: 17/935,680

(22) Filed: Sep. 27, 2022

(65) Prior Publication Data

US 2023/0106562 A1 Apr. 6, 2023

Related U.S. Application Data

(60) Provisional application No. 63/262,045, filed on Oct. 4, 2021.

(51) Int. Cl.
| | | |
|---|---|---|
| *B60W 50/14* | (2020.01) | |
| *B60W 40/068* | (2012.01) | |
| *B60W 40/105* | (2012.01) | |
| *B60W 50/00* | (2006.01) | |

(52) U.S. Cl.
CPC .......... *B60W 50/14* (2013.01); *B60W 40/068* (2013.01); *B60W 40/105* (2013.01); *B60W 50/0097* (2013.01); *B60W 2050/143* (2013.01); *B60W 2050/146* (2013.01); *B60W 2420/403* (2013.01); *B60W 2420/408* (2024.01); *B60W 2420/54* (2013.01); *B60W 2520/26* (2013.01); *B60W 2552/40* (2020.02); *B60W 2554/4041* (2020.02); *B60W 2554/4044* (2020.02)

(58) Field of Classification Search
CPC ..................................................... B60W 50/14
See application file for complete search history.

(56) References Cited

U.S. PATENT DOCUMENTS

| | | | |
|---|---|---|---|
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,874,317 | B2 | 10/2014 | Marczok et al. |
| 9,068,390 | B2 | 6/2015 | Ihlenburg et al. |

(Continued)

*Primary Examiner* — Travis R Hunnings
(74) *Attorney, Agent, or Firm* — HONIGMAN LLP

(57) ABSTRACT

A vehicular alert system includes at least one sensor disposed at a vehicle and sensing exterior of the vehicle. The at least one sensor captures sensor data. Electronic circuitry of an electronic control unit includes a processor for processing sensor data captured by the at least one sensor to detect presence of objects viewed by the at least one sensor. The vehicular alert system, responsive to determining a likelihood that the vehicle is parking, tracks a position of a detected object until the object leaves a field of sensing of the sensor. The vehicular alert system predicts a position of the object relative to the vehicle and determines the object is a hazard based on the predicted position. The vehicular alert system, responsive to determining that the detected object is a hazard, alerts an occupant of the vehicle of the detected object.

20 Claims, 4 Drawing Sheets

(56) References Cited

U.S. PATENT DOCUMENTS

| | | |
|---|---|---|
| 9,637,965 B1 | 5/2017 | Kothari |
| 9,688,199 B2 | 6/2017 | Koravadi |
| 9,947,227 B1 | 4/2018 | Dilger |
| 10,071,687 B2 | 9/2018 | Ihlenburg et al. |
| 10,099,614 B2 | 10/2018 | Diessner |
| 11,124,113 B2 | 9/2021 | Singh |
| 11,597,383 B1 * | 3/2023 | Sonalker ............... G06V 10/82 |
| 2009/0243822 A1 | 10/2009 | Hinninger et al. |
| 2013/0116859 A1 | 5/2013 | Ihlenburg et al. |
| 2014/0098230 A1 | 4/2014 | Baur |
| 2015/0298611 A1 | 10/2015 | Komoguchi et al. |
| 2015/0344028 A1 | 12/2015 | Gieseke et al. |
| 2016/0023598 A1 | 1/2016 | Kohler et al. |
| 2017/0008455 A1 | 1/2017 | Goudy et al. |
| 2017/0015312 A1 | 1/2017 | Latotzki |
| 2017/0017848 A1 | 1/2017 | Gupta et al. |
| 2017/0032677 A1 | 2/2017 | Seo |
| 2017/0050672 A1 | 2/2017 | Gieseke et al. |
| 2017/0197549 A1 | 7/2017 | Vladimerou et al. |
| 2017/0218678 A1 | 8/2017 | Kothari |
| 2017/0253237 A1 | 9/2017 | Diessner |
| 2017/0274821 A1 | 9/2017 | Goudy et al. |
| 2017/0317748 A1 | 11/2017 | Krapf |
| 2017/0329346 A1 | 11/2017 | Latotzki |
| 2018/0297520 A1 | 10/2018 | Morimura |
| 2019/0102602 A1 | 4/2019 | Uchida et al. |
| 2019/0102633 A1 | 4/2019 | Uchida et al. |
| 2019/0135278 A1 | 5/2019 | Hillman |
| 2019/0232863 A1 | 8/2019 | Rowell |
| 2020/0062248 A1 | 2/2020 | Hasegawa et al. |
| 2020/0192383 A1 | 6/2020 | Nath |
| 2020/0269837 A1 | 8/2020 | Nath et al. |
| 2021/0046927 A1 | 2/2021 | Miller et al. |
| 2021/0061241 A1 | 3/2021 | Liu et al. |
| 2021/0109543 A1 | 4/2021 | Hiromitsu et al. |
| 2021/0146833 A1 | 5/2021 | Kang |
| 2021/0323548 A1 | 10/2021 | Fukatsu et al. |
| 2022/0118970 A1 | 4/2022 | Takaki |
| 2022/0306090 A1 * | 9/2022 | Noguchi ............. B60W 30/181 |
| 2023/0032998 A1 | 2/2023 | Kushwaha et al. |

* cited by examiner

VEHICULAR DOOR OPENING WARNING SYSTEM

CROSS REFERENCE TO RELATED APPLICATION

The present application claims the filing benefits of U.S. provisional application Ser. No. 63/262,045, filed Oct. 4, 2021, which is hereby incorporated herein by reference in its entirety.

FIELD OF THE INVENTION

The present invention relates generally to a vehicular alert system for a vehicle and, more particularly, to a vehicular alert system that utilizes one or more sensors at a vehicle.

BACKGROUND OF THE INVENTION

It is known to use sensors to determine if it is safe to open a vehicle door. Examples of such known systems are described in U.S. Pat. Nos. 11,124,113; 9,688,199 and/or 9,068,390, which are hereby incorporated herein by reference in their entireties.

SUMMARY OF THE INVENTION

A vehicular alert system includes at least one sensor disposed at a vehicle equipped with the vehicular alert system and sensing exterior of the vehicle. The at least one sensor capturing sensor data. The system includes an electronic control unit (ECU) with electronic circuitry and associated software. The electronic circuitry of the ECU includes a processor for processing sensor data captured by the at least one sensor. The vehicular alert system, via processing at the ECU of sensor data captured by the at least one sensor, detects an object sensed by the at least one sensor. The vehicular alert system, as the vehicle is moving, determines a likelihood that the vehicle is parking. The vehicular alert system, responsive to determining that the likelihood that the vehicle is parking exceeds a threshold level, and while the vehicle is moving, tracks a position of the detected object relative to the equipped vehicle until the detected object leaves a field of sensing of the at least one sensor. The vehicular alert system, responsive to the detected object leaving the field of sensing of the at least one sensor as the vehicle moves, predicts a position of the detected object relative to the vehicle after the vehicle has further moved and when the vehicle stops. The vehicular alert system, responsive to determining the equipped vehicle has stopped moving, determines that the detected object is a hazard based on the predicted position of the detected object. The vehicular alert system, responsive to determining that the detected object is a hazard, alerts an occupant of the equipped vehicle of the detected object.

These and other objects, advantages, purposes and features of the present invention will become apparent upon review of the following specification in conjunction with the drawings.

DESCRIPTION OF THE PREFERRED EMBODIMENTS

A vehicular alert system and/or object detection system operates to capture images or sensor data exterior of the vehicle and may process the captured image data or sensor data to detect objects or hazardous situations at or near the vehicle, such as to assist an occupant in determining whether the detected object is a threat. The alert system includes a processor or image processing system that is operable to receive image data or sensor from one or more cameras or sensors. Optionally, the vision system may provide a display, such as a rearview display or a top down or bird's eye or surround view display or the like.

Figure 1:
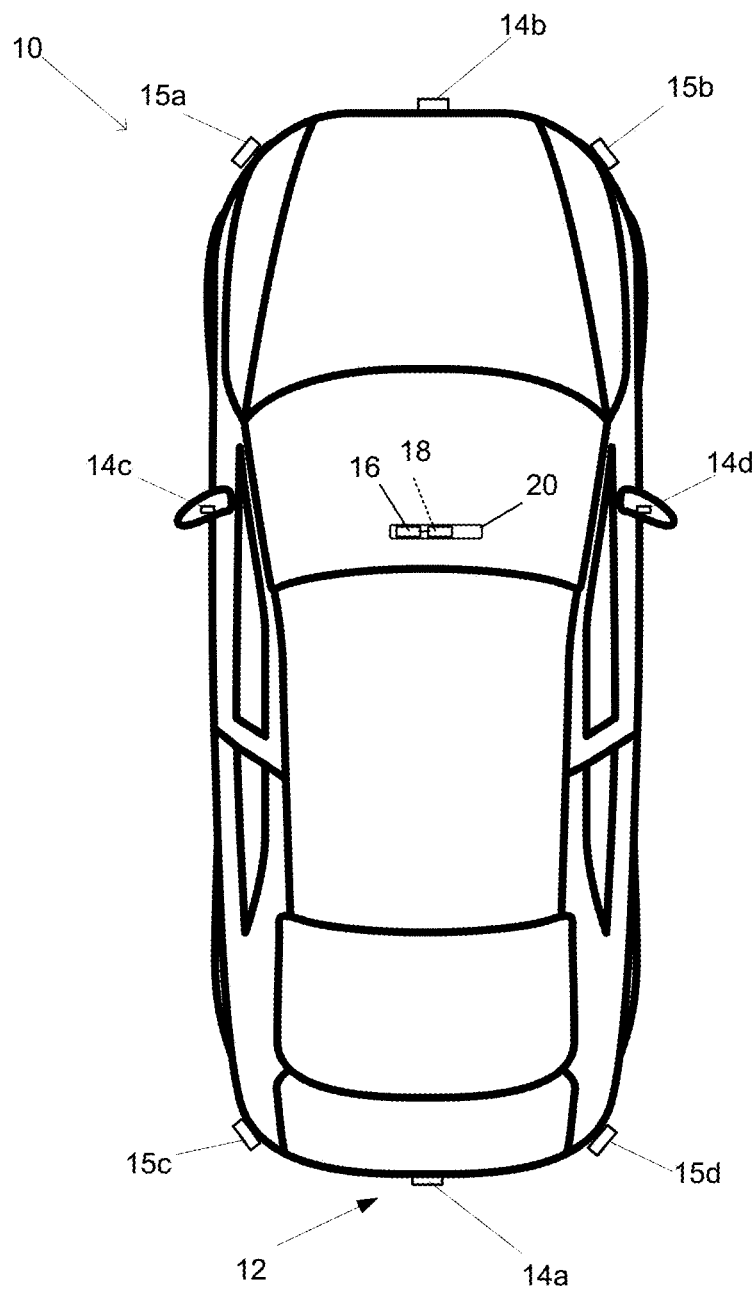
FIG. 1 is a plan view of a vehicle with an alert system that incorporates one or more sensors such as radar sensors and/or cameras.

Referring now to the drawings and the illustrative embodiments depicted therein, a vehicle 10 includes an imaging system or vision system or sensing system or alert system 12 that includes at least one exterior viewing imaging sensor or camera or radar sensor, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d or other surround cameras at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system or sensing system 12 may include one or more radar sensors, such as corner radar sensors 15a-d. The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
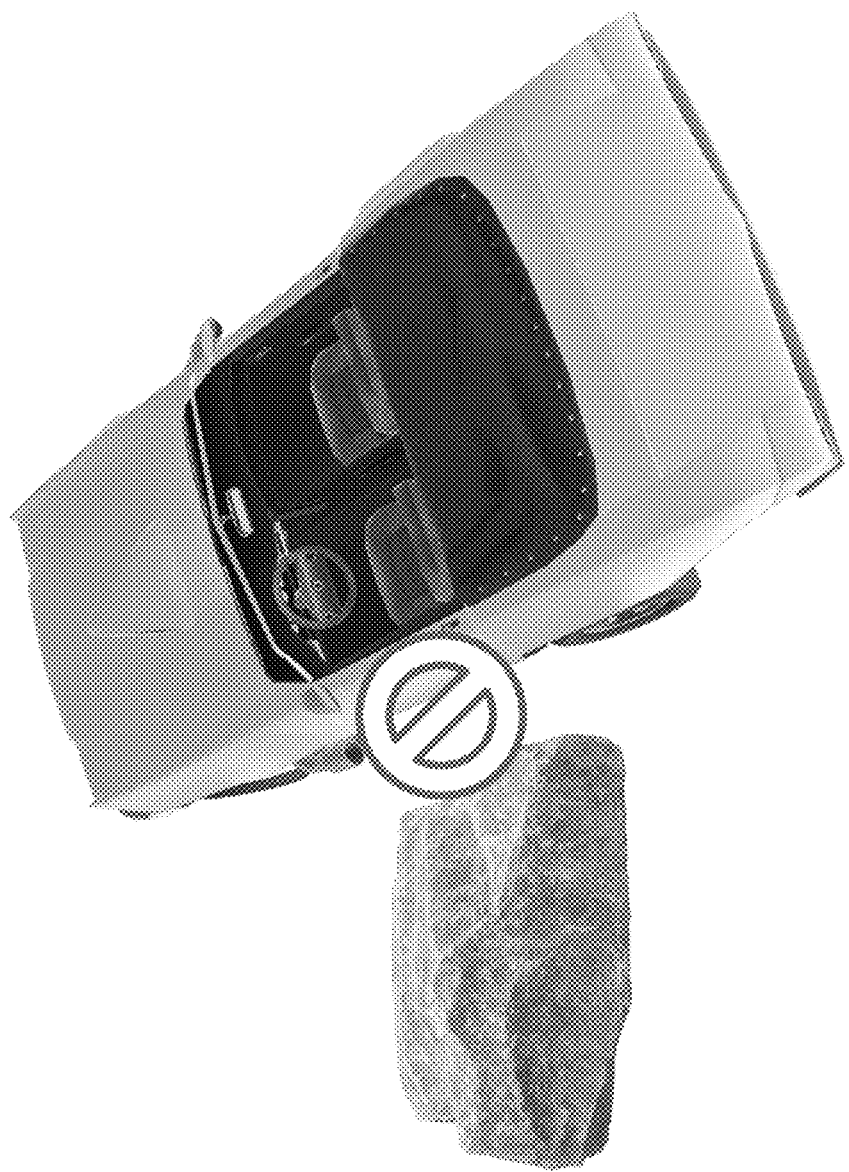
FIG. 2 is a perspective view of a vehicle with an obstacle within a swing path of a door of the vehicle.

Implementations herein include a system that incorporates a smart door open warning (SDOW) feature that alerts a driver/passenger of an equipped vehicle about hazardous conditions outside the vehicle before or when the user exits the vehicle. The SDOW feature, for example, prevents damage (e.g., scratches and/or dents) to the vehicle and door and/or injury to the occupant by detecting objects in close proximity of the vehicle (i.e., near and within a swing path of the doors and/or tailgate/rear hatch) (FIG. 2).

Figure 3:
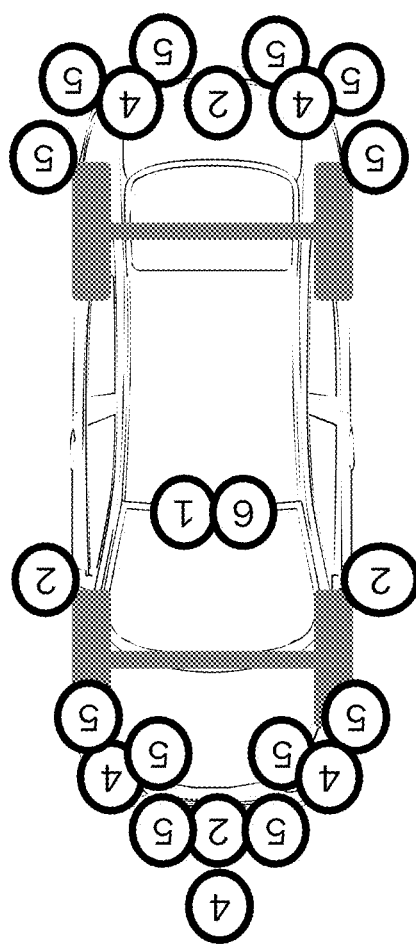
FIG. 3 is a schematic view of sensors of the alert system of FIG. 1.

Referring now to FIG. 3, the system may detect when the equipped vehicle is coming to a stop (e.g., as the speed of vehicle decreases to park, such as when the vehicle decreases by a threshold amount or when the vehicle speed goes below a threshold value), and then begins object detection and road/ground surface detection to determine conditions around the equipped vehicle. Optionally, the system begins detection after determining a likelihood that the vehicle will park in the near future satisfies a threshold level. Optionally, the system begins object detection after determining the vehicle has parked (e.g., the vehicle determines the vehicle has been placed in the parked gear) or after determining that the likelihood that an occupant of the vehicle is exiting the vehicle/opening the door (e.g., by detecting a seatbelt being unfastened, detecting a hand of an occupant on a door handle, etc.). The system detects hazardous conditions with a focus near the doors of the equipped vehicle. The system may generate alerts to occupants of the vehicle for a variety of conditions at or near the door or doors of the vehicle, such as puddles (i.e., water on the ground), ice and/or slippery surface conditions, objects within a swing path of the door (e.g., posts, other vehicles, curbs, etc.) and/or uneven surface conditions (e.g., cliffs, holes, humps, etc.) at the ground at or near the door or doors of the vehicle. The system may detect these conditions using a number of sensors, such as via using wheel slip, vehicle kinematics, radar, cameras, lidar, and other sensors (FIG. 3).

Figure 4:
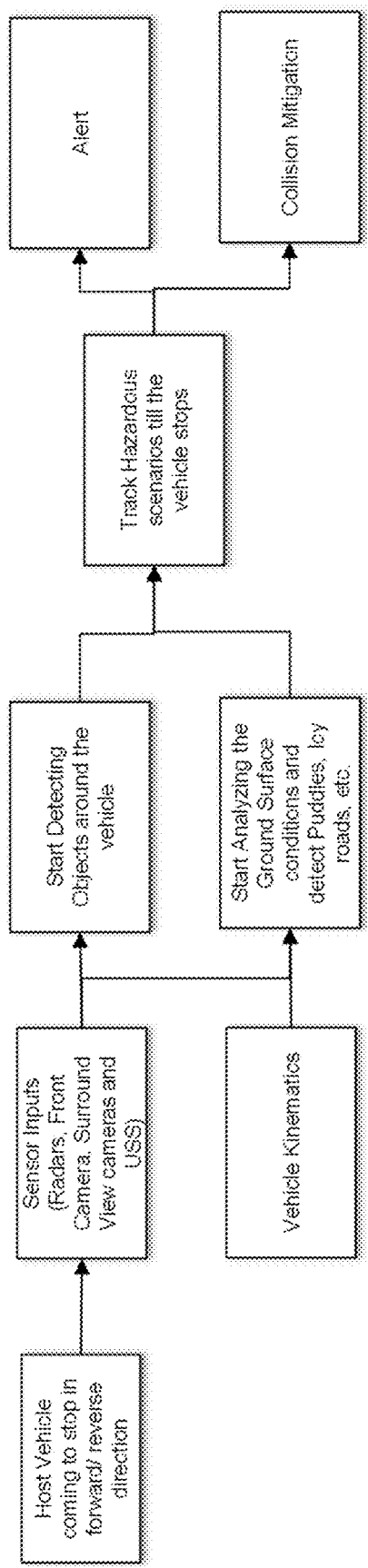
FIG. 4 is a block diagram of the system of FIG. 1.

Referring now to FIG. 4, the system may detect objects, obstacles, and surface conditions at or near each door of the equipped vehicle such as within a swing plane of the door/hatch. The system may detect objects, such as stones, trees, pedestrians, vehicles, etc. The system may use sensors mounted at the equipped vehicle. The sensors may include radars sensors (e.g., front or rear or corner mounted based on the gear position), a front camera module (FCM), and/or a rear backup camera to detect and track hazardous conditions. The system may use surround view cameras and/or ultrasonic sensors to detect objects that are not detected by radar sensors. Slippery conditions (e.g., icy conditions) may be detected based on wheel slip using vehicle kinematics and vehicle controller area network (CAN) signals, such as determined when or as the vehicle is slowing to a stop to park. Rain sensors may advise the occupant about precipitation and/or severe weather outside the vehicle.

Optionally, the system may continue to track the location of the objects after initial detection of the object (e.g., after detecting the object as the vehicle is slowing to park). In some cases, the system predicts the location of a tracked object when the object enter the blind zone of the sensors (e.g., immediately next of the vehicle) and thus disappears from a field of view of the sensors. The system may predict the path of the object using, for example, vehicle kinematics and trajectory. For example, a corner radar sensor may approach an obstacle as the vehicle slows to park. As the vehicle continues moving forward, the obstacle moves out of the field of sensing of the radar sensing. Despite the obstacle no longer being in the field of sensing of the radar sensor (or any other sensor of the vehicle), the system may predict or estimate (e.g., via vehicle kinematics) the position of the obstacle and determines, based on the predicted position, whether the obstacle is a hazard prior to an occupant opening a door of the vehicle. Thus, even if the vehicle lacks a sensor with a field of sensing proximate each door of the vehicle, the system may predict/estimate the locations of obstacles to provide the door open warning(s).

The system may provide a variety of different alerts to occupants of the vehicle based on detected objects and conditions. For example, the system provides an audible alert (e.g., an automated voice alert or audible tone or alarm) announcing presence of the detected objects and/or conditions. The audible alert may indicate a direction or position of the detected object/condition (e.g., which occupant and/or door is at risk). The alert may include image data (e.g., captured by one or more cameras of the vehicle) displayed (as a still image or as video images) on a display within the vehicle. The system may display text describing or indicating the detected objects/conditions. The alert may include one or more haptic alerts using, for example, seats, seat mats, door handles, and/or the steering wheel.

In some examples, the system determines if an imminent collision with a detected object is likely (i.e., greater than a threshold likeliness). When an imminent collision is detected (i.e., with a door of the vehicle or with an occupant of the vehicle after exiting the vehicle), the system may apply a threshold for maximum door opening angle (e.g., based on the detected objects size, trajectory, speed, etc.) in addition to an alert. For example, the system may limit how far the door can be opened in order to avoid or mitigate any potential collision. Optionally, the system may restrict from opening the door entirely. The system may restrict the door from opening until an occupant has acknowledged one or more warnings of the system. The system may include door opening warning aspects described in U.S. Pat. Nos. 11,124,113; 9,688,199 and/or 9,068,390, and/or U.S. patent application Ser. No. 17/815,675, filed Jul. 28, 2022, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular alert system, the vehicular alert system comprising:
   at least one sensor disposed at a vehicle equipped with the vehicular alert system and sensing exterior of the vehicle, the at least one sensor capturing sensor data;
   an electronic control unit (ECU) comprising electronic circuitry and associated software;
   wherein the electronic circuitry of the ECU comprises a processor for processing sensor data captured by the at least one sensor;
   wherein the vehicular alert system, via processing at the ECU of sensor data captured by the at least one sensor, detects an object sensed by the at least one sensor;
   wherein the vehicular alert system, as the vehicle is moving, determines a likelihood that the vehicle is parking;
   wherein the vehicular alert system, responsive to determining that the likelihood that the vehicle is parking exceeds a threshold level, and while the vehicle is moving, tracks a position of the detected object relative to the equipped vehicle until the detected object leaves a field of sensing of the at least one sensor;
   wherein the vehicular alert system, responsive to the detected object leaving the field of sensing of the at least one sensor as the vehicle moves, predicts a position of the detected object relative to the vehicle after the vehicle has further moved and when the vehicle stops;
   wherein the vehicular alert system, responsive to determining the equipped vehicle has stopped moving, determines that the detected object is a hazard based on the predicted position of the detected object; and
   wherein the vehicular alert system, responsive to determining that the detected object is a hazard, alerts an occupant of the equipped vehicle of the detected object.

2. The vehicular alert system of claim 1, wherein the at least one sensor comprises at least one selected from the group consisting of (i) a front camera module, (ii) a radar sensor, (iii) a surround camera and (iv) an ultrasonic sensor.

3. The vehicular alert system of claim 1, wherein the at least one sensor comprises a plurality of different types of sensors.

4. The vehicular alert system of claim 1, wherein the vehicular alert system determines that the likelihood that the vehicle is parking exceeds the threshold level based at least in part on a speed of the vehicle decreasing to a threshold speed.

5. The vehicular alert system of claim 1, wherein the vehicular alert system predicts the position of the detected object based on vehicle kinematics.

6. The vehicular alert system of claim 1, wherein the vehicular alert system, responsive to processing by the processor of sensor data captured by the at least one sensor, determines a hazardous condition of a ground surface exterior of the vehicle.

7. The vehicular alert system of claim 6, wherein the hazardous condition comprises a slippery condition.

8. The vehicular alert system of claim 6, wherein the vehicular alert system determines the hazardous condition based on an amount of wheel slip by the equipped vehicle.

9. The vehicular alert system of claim 1, wherein the alert comprises an audible alert.

10. The vehicular alert system of claim 1, wherein the alert comprises images displayed on a display device disposed within the equipped vehicle derived from, the displayed images derived from image data captured by the at least one sensor.

11. The vehicular alert system of claim 1, wherein the alert comprises a representation of the predicted position of the detected object.

12. The vehicular alert system of claim 1, wherein the vehicular alert system, responsive to determining the equipped vehicle has stopped moving, limits opening of a door based on the predicted position of the detected object.

13. A vehicular alert system, the vehicular alert system comprising:
   at least one sensor disposed at a vehicle equipped with the vehicular alert system and sensing exterior of the vehicle, the at least one sensor capturing sensor data;

an electronic control unit (ECU) comprising electronic circuitry and associated software;

wherein the electronic circuitry of the ECU comprises a processor for processing sensor data captured by the at least one sensor;

wherein the vehicular alert system, via processing at the ECU of sensor data captured by the at least one sensor, detects an object sensed by the at least one sensor;

wherein the vehicular alert system, while the vehicle is moving, tracks a position of the detected object relative to the equipped vehicle until the detected object leaves a field of sensing of the at least one sensor;

wherein the vehicular alert system, responsive to the detected object leaving the field of sensing of the at least one sensor as the vehicle moves, predicts a position of the detected object relative to the vehicle after the vehicle has further moved and when the vehicle stops;

wherein the vehicular alert system determines that the detected object is a hazard based on the predicted position of the detected object;

wherein the vehicular alert system, after the vehicle has stopped, determines a likelihood that an occupant is opening a door of the vehicle; and wherein the vehicular alert system, responsive to determining that the likelihood that the occupant is opening the door of the vehicle, alerts an occupant of the equipped vehicle of the detected object.

14. The vehicular alert system of claim 13, wherein the at least one sensor comprises at least one selected from the group consisting of (i) a front camera module, (ii) a radar sensor, (iii) a surround camera and (iv) an ultrasonic sensor.

15. The vehicular alert system of claim 13, wherein the at least one sensor comprises a plurality of different types of sensors.

16. The vehicular alert system of claim 13, wherein the vehicular alert system predicts the position of the detected object based on vehicle kinematics.

17. The vehicular alert system of claim 13, wherein the alert comprises a representation of the predicted position of the detected object.

18. A vehicular alert system, the vehicular alert system comprising:

at least one sensor disposed at a vehicle equipped with the vehicular alert system and sensing exterior of the vehicle, the at least one sensor capturing sensor data;

an electronic control unit (ECU) comprising electronic circuitry and associated software;

wherein the electronic circuitry of the ECU comprises a processor for processing sensor data captured by the at least one sensor;

wherein the vehicular alert system, via processing at the ECU of sensor data captured by the at least one sensor, detects an object sensed by the at least one sensor;

wherein the vehicular alert system, as the vehicle is moving, determines a likelihood that the vehicle is parking based at least partially on a speed of the vehicle;

wherein the vehicular alert system, responsive to determining that the likelihood that the vehicle is parking exceeds a threshold level, and while the vehicle is moving, tracks a position of the detected object relative to the equipped vehicle until the detected object leaves a field of sensing of the at least one sensor;

wherein the vehicular alert system, responsive to the detected object leaving the field of sensing of the at least one sensor as the vehicle moves, predicts a position of the detected object relative to the vehicle after the vehicle has further moved and when the vehicle stops based at least in part on vehicle kinematics;

wherein the vehicular alert system, responsive to determining the equipped vehicle has stopped moving, determines that the detected object is a hazard based on the predicted position of the detected object; and wherein the vehicular alert system, responsive to determining that the detected object is a hazard, alerts an occupant of the equipped vehicle of the detected object.

19. The vehicular alert system of claim 18, wherein the at least one sensor comprises at least one selected from the group consisting of (i) a front camera module, (ii) a radar sensor, (iii) a surround camera and (iv) an ultrasonic sensor.

20. The vehicular alert system of claim 18, wherein the at least one sensor comprises a plurality of different types of sensors.

* * * * *